United States Patent [19]
Braswell-Moore

[11] Patent Number: 5,491,842
[45] Date of Patent: Feb. 20, 1996

[54] ADJUSTABLE EYEGLASS RETAINER HEADPIECE

[76] Inventor: Glenda Braswell-Moore, 405 Maiden La., Chesapeake, Va. 23325

[21] Appl. No.: 265,021

[22] Filed: Jun. 24, 1994

[51] Int. Cl.$^6$ ................................ A42B 1/24; G02C 3/00
[52] U.S. Cl. .................... 2/10; 2/209.13; 2/918; 351/155
[58] Field of Search ............................. 2/10, 13, 209.13, 2/909, 918; 351/155, 156; 128/201.12

[56] References Cited

U.S. PATENT DOCUMENTS

| 4,152,051 | 5/1979 | Van Tiem et al. ........... 351/155 X |
| 4,312,338 | 1/1982 | Glassman ................... 128/201.12 |
| 4,322,138 | 3/1982 | Minart ......................... 351/155 |
| 4,387,471 | 6/1983 | Hsu et al. . | |
| 5,123,115 | 6/1992 | Braswell-Moore . | |

Primary Examiner—Peter Nerbun
Attorney, Agent, or Firm—Griffin, Butler, Whisenhunt & Kurtossy

[57] ABSTRACT

An adjustable eyeglass retainer headpiece (10) has a circumferential slit (20) in a cap (12) thereof spaced a substantial distance above a lower edge (16a) of the cap but below an attachment area (22) of a proximal end portion (30) of an eyeglass retainer member (14). The retainer member (14) extends from the attachment area through the slit to an interior surface (24) of the cap and from there to a distal end portion (32) which extends below the lower edge of the cap for passing about a nose bridge (52) of eyeglasses (50). A lower-edge margin (26) of the cap extending between the lower edge and the slit is substantially unattached to the retainer member so that it can be folded upwardly to adjust the size of the cap.

8 Claims, 2 Drawing Sheets

ADJUSTABLE EYEGLASS RETAINER HEADPIECE

BACKGROUND OF THE INVENTION

This invention relates generally to headpieces used by technicians, specifically medical personnel, including surgeons. Even more particularly, this invention relates to apparatus for retaining eyeglasses or safety glasses in place on technicians during procedures performed by the technicians.

U.S. Pat. No. 5,123,115 to Braswell-Moore describes a surgeon's headpiece having an elongated, flexible eyeglass retainer member attached to a front portion of a cap of the headpiece for extending below the cap, passing about a bridge of eyeglasses, and doubling back on itself to fasten on itself. In a depicted embodiment of that patent, the eyeglass retainer member is fastened to the cap in such a manner that a proximal end portion thereof, which is attached to the interior of the cap, is exposed at the exterior of the cap by a radial slit in the cap. Although the cap of the headpiece of U.S. Pat. No. 5,123,115 includes a tether about a lower edge thereof which can be tied to adjust the headpiece to various diameter heads, this adjustment does not take into consideration a distance from a wearer's crown to his nose. That is, the headpiece of U.S. Pat. No. 5,123,115 will work for those having average-size and large-size heads, however, for one having a smaller than average-size head, a front lower edge of the cap can get too close to the wearer's eyes and nose. Such a person can adjust the size of a standard surgeon's headpiece (a headpiece not having an eyeglass retainer member) by folding upwardly a front lower-edge margin of its cap before tying the adjusting tether in back of the person's head. However, the surgeon headpiece of U.S. Pat. No. 5,123,115 complicates this fold-back adjustment since the eyeglass retainer thereof is fastened to the front portion of the cap down to its lower edge so that, a user cannot fold the lower-edge margin upwardly. Thus, it is an object of this invention to provide a headpiece for technicians of a type having an eyeglass retainer attached to a front portion of a cap thereof which also allows a front lower-edge margin of the cap to be folded upwardly for adjusting the size of the headpiece to fit various size heads.

Another problem with the surgeon's headpiece of U.S. Pat. No. 5,123,115 is that it is rather expensive to construct in that one must sew the eyeglass retainer thereof to edges of the radial slit in the cap. U.S. Pat. No. 4,387,471 to Hsu et al. had previously suggested to use an adhesive for detachably connecting a retainer to an exterior surface of a front portion of a surgeon's hood. Although such an attachment is less expensive than the attachment suggested Braswell-Moore in U.S. Pat. No. 5,123,115, it has the disadvantage that surgeons often perspire perfusly during operations and surgeon's caps and hoods, therefore, become wet so that the adhesive fails. A related problem is that, because the eyeglass retainer is fastened to the exterior surface of the surgeon's hood, it can be easily pulled away from the hood by the surgeon when he is attempting to disengage the doubled back distal portion of the retainer from a proximal portion. Therefore, it is an object of this invention to provide an eyeglass retainer headpiece for use by technicians which is relatively inexpensive to construct, but with which an eyeglass retainer thereof is firmly, and permanently attached to a cap thereof without undue fear that it can be pulled away by a user.

SUMMARY

According to principles of this invention, an eyeglass-retainer headpiece includes a slit in a front of a cap thereof which is spaced a substantial distance above a lower edge of the cap and below an exterior attachment area of a proximal end portion of an eyeglass retainer member. The eyeglass retainer member then extends from the exterior attachment area through the slit to an interior surface of the cap and to the distal end portion which extends below a lower edge of the cap to double about a bridge of eyeglasses. Thus, a front lower edge margin is left free to be folded back.

BRIEF DESCRIPTION OF THE DRAWING

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

A medical technician's headpiece 10 comprises a cap 12 and an elongated, flexible, eyeglass retainer member 14.

Figure 1:
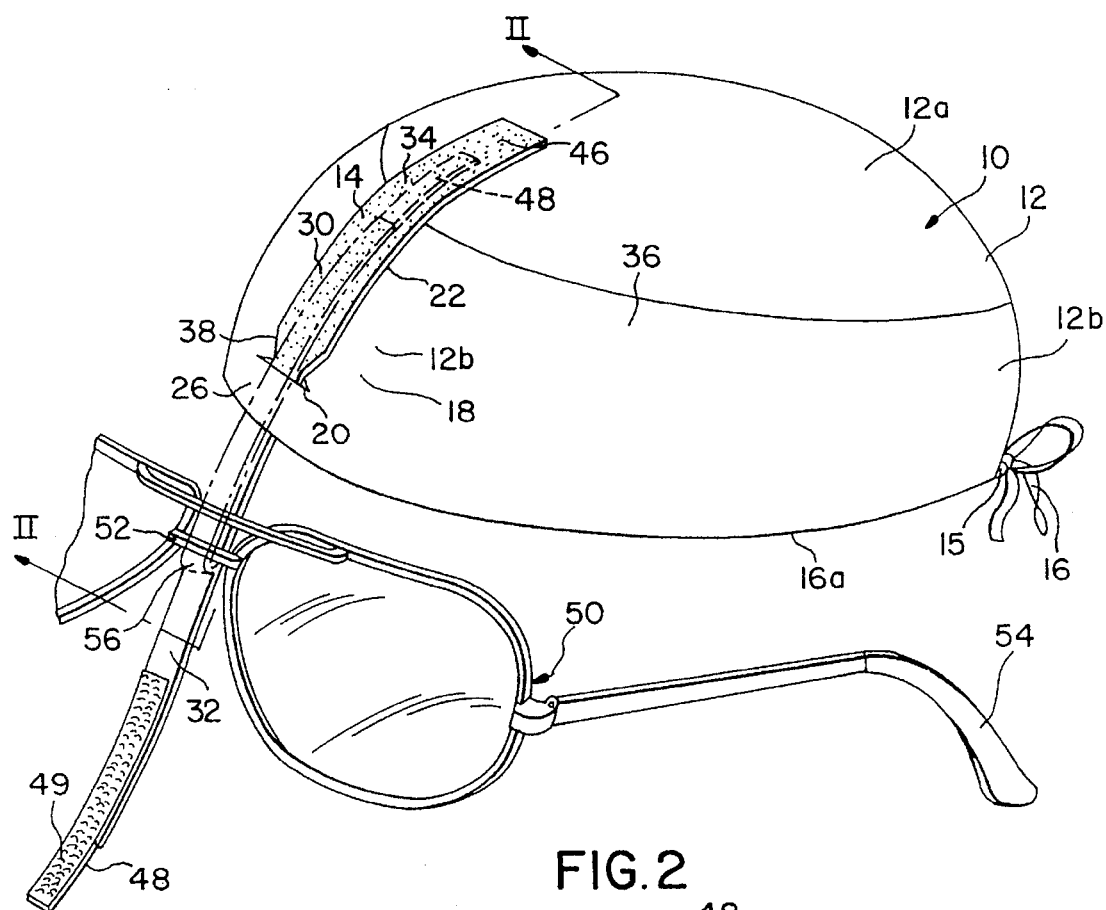
FIG. 1 is an isometric view of a surgeon's headpiece including an eyeglass retainer member of this invention along with a pair of eyeglasses, the eyeglass retainer member being shown fastened about a nose bridge of the eyeglasses in phantom, with a lower-edge margin of a cap of the headpiece being turned down so that the cap fits a relatively large head.

The cap 12 is normally of a tough tissue-like material which can be relatively easily torn, is quite absorbent, and is quite porous for allowing passage of air therethrough. A crown portion 12a is normally thinner and more porous than a temple portion 12b, the temple portion 12b being more absorbent for absorbing perspiration of a wearer. The particular cap shown in FIG. 1 is a type normally worn by surgeons during operations. The depicted cap 12 has a small radial slit 15 in the back thereof with a tether 16 extending from free ends thereof at the slit about a lower edge 16a of the cap 10. By pulling the free ends of the tether tight, and tying the ends together, a surgeon, or other technician, can adjust the lower edge 16a of the cap 12 to fit a diameter of his head.

The eyeglass retainer member 14 is sewn to a front portion 18 of the cap 12 at an attachment area 22, as is depicted in FIG. 1. In this regard, an enlarged proximal end portion 30 of the eyeglass retainer member 14 is sewn to an exterior surface 36 of the cap 12 so as to extend both over the crown portion 12a and the temple portion 12b. In this regard, the proximal end portion 30, which is sewn to the exterior surface 36 of the cap 12 has a substantially greater width than a distal, or outer-end, portion 32 of the eyeglass retainer member, which distal end portion extends below the lower edge 16a of the cap 12. It can be seen in all three Figures that when the eyeglass retainer member 14 is sewn to the exterior surface 36 of the cap 12, in the manner described, a top surface 34 of the wider proximal end portion 30 is exposed from an exterior of the cap 12. The proximal end portion 30 of the eyeglass retainer member 14 is about 1¼ inches wide and 2–4 inches long while the distal end portion 32 is about ⅜ inches wide and about 4–6 inches long. The proximal and distal end portions 30 and 32 join one another at a Y-shaped tapered interface 38. In a preferred embodiment, a base member of the eyeglass retainer member 14 is constructed of a soft foam plastic core 42 having layers of soft loop-fastener material 44 with fastening loops 46 extending outwardly therefrom.

A 1⅜ inch piece of hook fastener material 48 is attached approximately at a distal end of the distal end portion 32 so that its hooks face in the same direction as the exterior surface 36 of the cap 12 when the retainer member is extended in a linear configuration. The soft material 44, with its fastening loops 46, and the hooks fastener material 48, with hooks 49, can be of a type sold under the trademark VELCRO, however, other materials will work as well.

Figure 2:
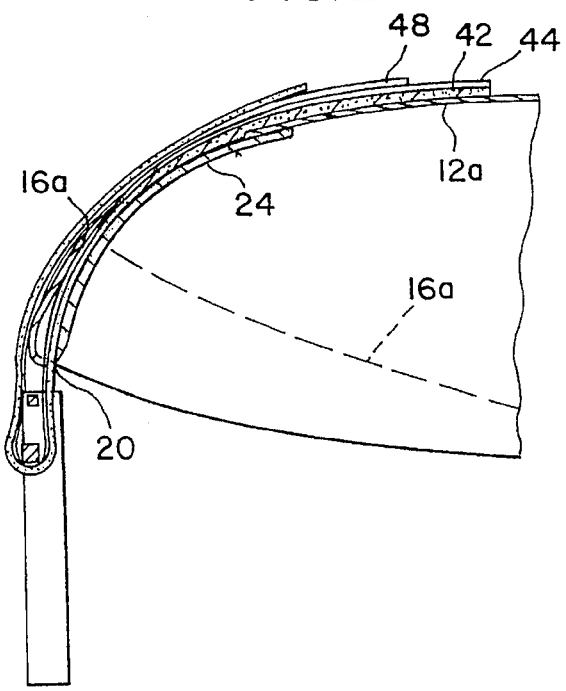
FIG. 2 is a cutaway, fragmented, cross sectional view taking on line II—II in FIG. 1, but with the lower-edge margin being turned up to adjust the cap to fit a smaller head.
Figure 3:
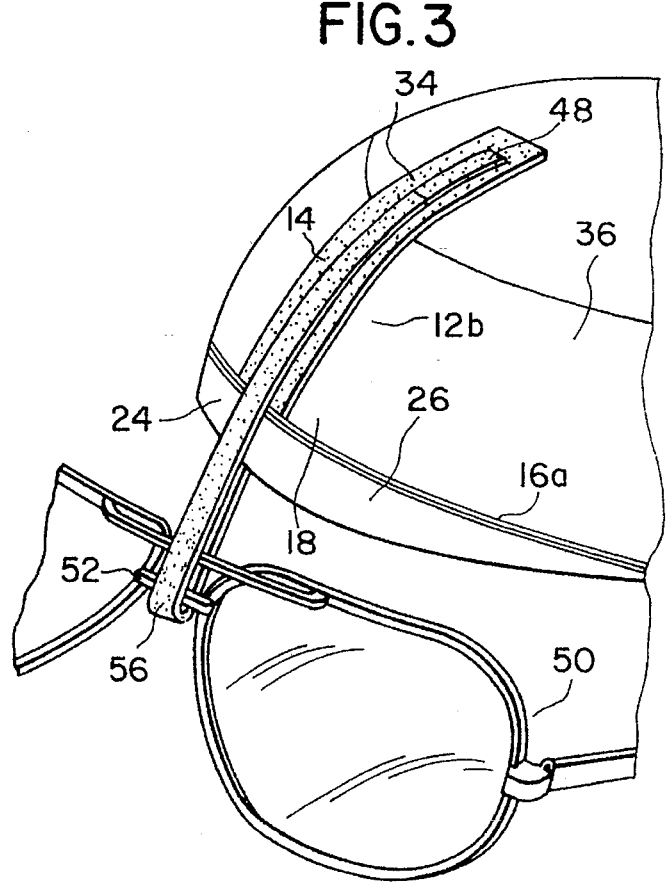
FIG. 3 is a cutaway, fragmented, isometric view of the technician's headpiece of FIG. 1, but with the lower-edge margin being folded upwardly to adjust the cap to fit a smaller head.

The headpiece of this invention differs from those of U.S. Pat. No. 5,123,115 to Braswell-Moore and U.S. Pat. No. 4,387,471 to Hsu et al. in that the cap 12 thereof has a circumferential slit 20 therein which is spaced a substantial distance above the lower edge 16a of the cap but below the attachment area 22 where the proximal end portion 30 is attached to the exterior surface 36 of the cap 12. The retainer member 14, below the Y-shaped tapered interface 38, extends through this slit 20, from the attached portion of the proximal end portion 30, to an interior surface 24 of the cap and from there, to the distal end portion 32 of the eyeglass retainer member 14 below the lower edge 16a of the cap 12. A lower-edge margin 26 of the cap 12, between the slit 20 and the lower edge 16a, is substantially unattached to the retainer member 14 so that it can be folded upwardly to adjust the size of the cap as is shown in FIGS. 2 and 3.

In operation, the attached portion of the proximal end portion 30 of the eyeglass retainer member 14 is permanently sewn or fused (by sonic fusing, for example) to the exterior surface 36 of the cap 12, as is depicted in the drawings at the attachment area 22. When putting on the headpiece 10, the surgeon either leaves the lower-edge margin 26 in its folded down position, as is depicted in FIG. 1, or folds the lower-edge margin 26 into its folded up position, as is depicted in FIGS. 2 and 3, before adjusting the tether 16. The free ends of the tether 16 are then tightened and tied together with a bow knot so that the cap is held adjusted to fit the technician's head. Once the headpiece is on the technician's head, with the ends of the tether 16 tied at the rear of the technicians head, the distal end portion 32 of the eyeglass retainer member 14 extends downwardly along his nose. The technician then places eyeglasses 50 on his face so that a nose bridge 52 thereof rests at the top of his nose, over the distal end portion 32, and ear pieces 54 of the eyeglasses extend about his ears. When the surgeon has adjusted the eyeglasses 50 to a comfortable position, he loops the narrow distal end portion 32 of the eyeglass retainer member 14 upwardly about the nose bridge 52 and presses the hooks 49 of the hook fastener material 48 against the fastening loops 46 on the top surface 34 of the proximal end portion 30 so that the fastening hooks and loops fasten to one another. In this configuration, the distal end portion 32 forms a loop 56, as is depicted in phantom in FIG. 1, enclosing in the nose bridge 52 of the eyeglasses 50. This loop securely holds the eyeglasses in position on the surgeon's nose, not letting the nose bridge 52 slide down his nose.

It will by appreciated by those of ordinary skill in the art that the headpiece of this invention can be used to retain eyeglasses on a technicians head just as well as can the headpiece of U.S. Pat. No. 5,123,115, but yet it has the additional advantage that a lower-edge margin 26 thereof can be folded upwardly to further adjust the size of the cap 12 to fit various size heads.

Yet another advantage of this invention is that it can be manufactured easily and cost effectively.

Still further, by having the eyeglass retainer member 14 extend below the tether 16 at the lower edge 16a, the attachment area 22 of the proximal end portion 30 is held against the cap 12 by the tether 16, both in the folded down and up positions, to thereby aid in maintaining the attachment of the eyeglass retainer member 14 to the cap 12. This is especially beneficial when the cap 12 becomes wet with perspiration.

While the invention has been particularly shown and described with reference to a preferred embodiment thereof, it will be understood by those skilled in the art that various changes in form and detail may be made therein without departing from the spirit and scope of the invention. For example, it would be possible to attach the proximal end portion 30 of the eyeglass retainer member 14 to the interior of the cap 12 with a radial slit extending lengthwise of the eyeglass retainer member 14 to uncover the fastening loops 46 on the top surface 34 of the eyeglass retainer member 14. In this embodiment, the eyeglass retainer member 14 would not actually extend through a slit, such as the slit 20, depicted in FIG. 1, but rather, would extend below the lower-edge margin 26 without being attached thereto so that the lower-edge margin could still be folded upwardly as is depicted in FIGS. 2 and 3.

Figure 4:
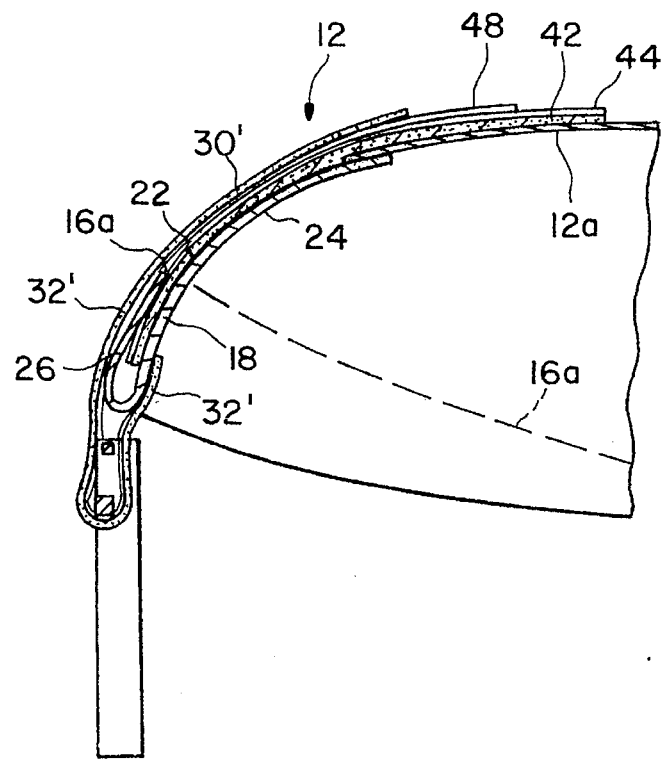
FIG. 4 is a view similar to FIG. 3 of another embodiment in which the eyeglass retainer member is formed as two separate pieces.

In still another embodiment (shown in FIG. 4) of this invention the eyeglass retainer member is comprised of two separate pieces, an attachment piece 30' which is sewn to the front portion 18 of the cap 12 at the attachment area 22 and a retainer piece 32' which is separately sewn to the interior surface 24 of the front portion 18 of the cap 12. However, both of these pieces are sewn to the cap above the lower-edge margin 26 so that the lower-edge margin 26 can still be folded upwardly. Thus, in this embodiment, the eyeglass retainer member does not need to extend through a slit 20 as is depicted in FIG. 1, rather, it is formed of two separate pieces, which are separated at the tapered interface 38, with a distal end portion being sewn into the interior of the cap, but, above the lower margin 26.

The embodiments of the invention in which an exclusive property or privilege are claimed are defined as follows:

1. A technician's headpiece for being placed on a technician's head for receiving the technician's head in an interior of a cap of the headpiece with a front portion of said cap being approximately above the technician's nose, and for retaining eyeglasses worn by the technician, said headpiece including:

said cap;

an elongated, flexible, eyeglass retainer member having a proximal end portion attached to the front portion of the cap and a distal end portion for extending below a lower edge of the cap, adapted to pass about a bridge of said eyeglasses, doubling back on itself and being fastened to itself, said proximal end portion being fastened to said front portion of said cap at an attachment area on said cap so as to expose a top surface of said proximal end portion to an exterior of said cap;

wherein said cap includes a lower-edge margin between said attachment area and a lower edge of said cap which extends over said eyeglass retainer member so that said eyeglass retainer member is at an interior of said cap at said lower-edge margin, said lower-edge margin not being substantially attached to said eyeglass retainer so that said lower-edge margin can be folded upwardly against an exterior surface of the rest of said cap.

2. A technician's headpiece as in claim 1 wherein said attachment area is at an exterior surface of said cap so that said proximal end of said retainer member is fastened on the exterior surface of the cap and wherein said front portion of said cap has a slit therein positioned above the lower-edge margin of said cap and wherein said retainer member is constructed as one piece and extends from said attached portion through said slit to an interior surface of said cap and to said distal end portion which extends below the edge of said cap.

3. A technician's headpiece as in claim 2 wherein said lower-edge margin is substantially unattached to said retainer member so that it can be folded upwardly to adjust the size of said cap.

4. A technician's headpiece as in claim 3 wherein said proximal end of said eyeglass retainer member is fastened to said front portion of said cap by being sewn thereto.

5. A technician's headpiece as in claim 3 wherein said proximal end of said eyeglass retainer member is fastened to said front portion of said cap by being fused thereto.

6. A technician's headpiece as in claim 2 wherein is further included a tether extending about the lower edge of said cap and having two free ends which can be tied together for adjusting the size of said lower edge with said tether passing through, and forming part of, said lower-edge margin so as to extend over said eyeglass retainer member.

7. A technician's headpiece as in claim 1 wherein is further included a tether extending about the lower edge of said cap and having two free ends which can be tied together for adjusting the size of said lower edge with said tether passing through, and forming part of, said lower-edge margin so as to extend over said eyeglass retainer member.

8. A technician's headpiece as in claim 1 wherein the proximal end portion of said elongated, flexible, eyeglass retainer member is a separate piece from said distal end portion and wherein said distal end portion is attached to said front portion of said cap on an interior surface thereof above said lower-edge margin.

* * * * *